United States Patent
Gomi et al.

(10) Patent No.: US 10,325,252 B2
(45) Date of Patent: Jun. 18, 2019

(54) PAYMENT MANAGEMENT APPARATUS, PAYMENT MANAGEMENT METHOD, AND STORAGE MEDIUM

(71) Applicant: YAHOO JAPAN CORPORATION, Tokyo (JP)

(72) Inventors: Hidehito Gomi, Tokyo (JP); Yusuke Kondo, Tokyo (JP); Shuji Yamaguchi, Tokyo (JP); Shinya Aoki, Tokyo (JP); Naoya Kato, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 866 days.

(21) Appl. No.: 14/849,085

(22) Filed: Sep. 9, 2015

(65) Prior Publication Data

US 2016/0086150 A1    Mar. 24, 2016

(30) Foreign Application Priority Data

Sep. 19, 2014   (JP) ................................. 2014-191135

(51) Int. Cl.
 *G06Q 20/22*   (2012.01)
 *G06Q 20/10*   (2012.01)
(52) U.S. Cl.
 CPC ......... *G06Q 20/227* (2013.01); *G06Q 20/102* (2013.01)
(58) Field of Classification Search
 CPC ........ G06Q 10/00; G06Q 20/00; G06Q 30/00; G06Q 40/00

(Continued)

(56) References Cited

U.S. PATENT DOCUMENTS 7,526,448 B2 *   4/2009   Zielke .................. G06Q 20/102
                                                                  705/40
8,185,433 B2 *   5/2012   Summer ............ G06Q 30/0225
                                                                  705/14.26

(Continued)

FOREIGN PATENT DOCUMENTS

JP   2003-216880 A    7/2003
JP   2003-337916 A   11/2003

(Continued)

OTHER PUBLICATIONS

Mar. 29, 2016 Office Action issued in Japanese Patent Application No. 2014-191135.

(Continued)

*Primary Examiner* — Frantzy Poinvil
(74) *Attorney, Agent, or Firm* — Oliff PLC

(57) ABSTRACT

A payment management apparatus according to an embodiment includes a purchase request receiving unit, a payment candidate selecting unit, a list information notifying unit, a selected information acquiring unit, and a payment unit. The purchase request receiving unit receives a purchase request transmitted from a user terminal. The payment candidate selecting unit selects payment candidates as candidates for a payer who pays a price for a purchasing object corresponding to the purchase request on behalf of a user who holds the user terminal. The list information notifying unit notifies the user terminal of information on a list of the payment candidates. The selected information acquiring unit acquires, from the user terminal, information on a payment candidate selected from the list of the payment candidates as information on a selected candidate. The payment unit performs a payment process on the purchasing object based on the information on the selected candidate.

12 Claims, 12 Drawing Sheets

| USER ID | NUMBER OF PAYMENT ACCEPTANCE REQUESTS | NUMBER OF PAYMENT ACCEPTANCES | ACCEPTANCE RATE | TYPE/CONTENT OF PRODUCT | PRICE | PURCHASE TIME | STORE NAME/ STORE TYPE | ... |
|---|---|---|---|---|---|---|---|---|
| A | 20 | 18 | 90% | BOOK/MUSICAL INSTRUMENT | 1000 TO 20000 YEN | ... | ○○ BOOKSTORE, ... | ... |
| B | 10 | 8 | 80% | CLOTHES | 5000 TO 15000 YEN | ... | XX DEPARTMENT STORE | ... |
| C | 6 | 3 | 50% | CLOTHES | 3000 TO 10000 YEN | ... | △△ SHOP | ... |
| D | 4 | 1 | 25% | FOOD | 3000 YEN | ... | XX DEPARTMENT STORE | ... |
| ⋮ | ⋮ | ⋮ | ⋮ | ⋮ | ⋮ | ⋮ | ⋮ | ⋮ |

(58) Field of Classification Search
USPC .................................................. 705/3–44
See application file for complete search history.

(56) References Cited

U.S. PATENT DOCUMENTS

| | | | | |
|---|---|---|---|---|
| 8,560,447 | B1* | 10/2013 | Hinghole | G06Q 40/02 |
| | | | | 705/35 |
| 8,606,705 | B2* | 12/2013 | Zanzot | G06Q 20/10 |
| | | | | 705/40 |
| 2007/0000999 | A1* | 1/2007 | Kubo | G06Q 20/40 |
| | | | | 235/380 |
| 2013/0041824 | A1* | 2/2013 | Gupta | G06Q 20/14 |
| | | | | 705/44 |
| 2013/0151357 | A1* | 6/2013 | Havas | G06Q 50/12 |
| | | | | 705/15 |
| 2015/0127527 | A1* | 5/2015 | Eide | G06Q 20/227 |
| | | | | 705/39 |

FOREIGN PATENT DOCUMENTS

| | | |
|---|---|---|
| JP | 2008-077488 A | 4/2008 |
| JP | 4278404 B2 | 6/2009 |
| JP | 2013-003771 A | 1/2013 |
| JP | 2014-010796 A | 1/2014 |
| WO | 2013/084268 A1 | 6/2013 |

OTHER PUBLICATIONS

Oct. 23, 2018 Office Action Issued in Japanese Patent Application No. 2016-173300.

* cited by examiner

FIG.7

| USER ID | NUMBER OF PAYMENT ACCEPTANCE REQUESTS | NUMBER OF PAYMENT ACCEPTANCES | ACCEPT-ANCE RATE | TYPE/CONTENT OF PRODUCT | PRICE | PURCHASE TIME | STORE NAME/ STORE TYPE | ... |
|---|---|---|---|---|---|---|---|---|
| A | 20 | 18 | 90% | BOOK/MUSICAL INSTRUMENT | 1000 TO 20000 YEN | ... | ○○ BOOKSTORE, ... | ... |
| B | 10 | 8 | 80% | CLOTHES | 5000 TO 15000 YEN | ... | XX DEPARTMENT STORE | ... |
| C | 6 | 3 | 50% | CLOTHES | 3000 TO 10000 YEN | ... | △△ SHOP | ... |
| D | 4 | 1 | 25% | FOOD | 3000 YEN | ... | XX DEPARTMENT STORE | ... |
| ... | ... | ... | ... | ... | ... | ... | ... | ... |

FIG.8

| USER ID | USER NAME | TYPE/ CONTENT OF PRODUCT | UPPER LIMIT OF PRICE | PURCHASE TIME | STORE NAME/ STORE TYPE | TIME LIMIT FOR PAYMENT ACCEPTANCE | ... |
|---|---|---|---|---|---|---|---|
| A | USER U | BOOK | 10000 YEN | 15$^{TH}$ TO 20$^{TH}$ OF EACH MONTH | OO BOOKSTORE | - | ... |
| B | USER U | CLOTHES | 20000 YEN | - | XX DEPARTMENT STORE | END OF DECEMBER | ... |
| C | USER U | CLOTHES | 10000 YEN | - | - | - | ... |
| D | USER U | - | - | - | - | - | ... |
| ... | ... | ... | ... | ... | ... | ... | ... |

| USER ID | USER NAME | TYPE/ CONTENT OF PRODUCT | PRICE | PURCHASE TIME | STORE NAME/ STORE TYPE | TIME LIMIT FOR DENIAL OF PAYMENT ACCEPTANCE | ... |
|---|---|---|---|---|---|---|---|
| A | USER U | TOY | - | 25TH TO 30TH OF EACH MONTH | □□ TOY SHOP | - | ... |
| B | USER U | ACCESSARY | 30000 YEN OR MORE | - | △△ JEWELRY STORE | - | ... |
| C | USER U | - | 20000 YEN OR MORE | - | - | END OF DECEMBER | ... |
| D | USER U | - | - | - | - | - | ... |
| ... | ... | ... | ... | ... | ... | ... | ... |

17

PAYMENT MANAGEMENT APPARATUS, PAYMENT MANAGEMENT METHOD, AND STORAGE MEDIUM

CROSS-REFERENCE TO RELATED APPLICATION

The present application claims priority to and incorporates by reference the entire contents of Japanese Patent Application No. 2014-191135 filed in Japan on Sep. 19, 2014.

BACKGROUND OF THE INVENTION

1. Field of the Invention

The present invention relates to a payment management apparatus, a payment management method, and a storage medium.

2. Description of the Related Art

Conventionally, there is a known technology for making payment by credit card, bank credit transfer, or the like to purchase a product or a service in a store or over the Internet. In this technology, for example, a payment process is performed when a user who owns the credit card or the like inputs own payment information (for example, information on a credit card number or the like) into a web page or the like, or is performed when the user uses own payment information registered in a payment management apparatus in advance.

Meanwhile, in some cases, when a user purchases a product, the user may request a person, such as a parent, other than oneself to make payment of the price for the product on behalf of the user. Therefore, in recent years, there has been proposed a technology in which, for example, information on a relationship between a person requested to make payment and the user is registered in the payment management apparatus in advance, and the payment management apparatus makes payment by using payment information on the registered person (for example, see Japanese Patent No. 4278404).

However, in the conventional technology as described above, only persons having the relationships as registered in advance can perform the payment process, and thus there is a need to improve convenience.

SUMMARY OF THE INVENTION

A payment management apparatus according to an embodiment includes a purchase request receiving unit, a payment candidate selecting unit, a list information notifying unit, a selected information acquiring unit, and a payment unit. The purchase request receiving unit receives a purchase request transmitted from a user terminal. The payment candidate selecting unit selects a plurality of payment candidates as candidates for a payer who pays a price for a purchasing object corresponding to the purchase request received by the purchase request receiving unit on behalf of a user who holds the user terminal. The list information notifying unit notifies the user terminal of information on a list of the payment candidates selected by the payment candidate selecting unit. The selected information acquiring unit acquires, from the user terminal, information on a payment candidate selected from the list of the payment candidates as information on a selected candidate. The payment unit performs a payment process on the purchasing object based on the information on the selected candidate acquired by the selected information acquiring unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram illustrating an example of a history table;

FIG. 8 is a diagram illustrating an example of a payment acceptance policy table;

FIG. 9 is a diagram illustrating an example of a payment acceptance denial policy table;

DETAILED DESCRIPTION OF THE PREFERRED EMBODIMENT

An exemplary embodiment of a payment management apparatus, a payment management method, and a storage medium according to the present application will be described in detail below with reference to the drawings. The payment management apparatus, the payment management method, and the storage medium according to the present application are not limited by the embodiment. In the embodiment below, the same components are denoted by the same reference symbols, and the same explanation will not be repeated.

1. Process by Payment Management Apparatus

Figure 1:
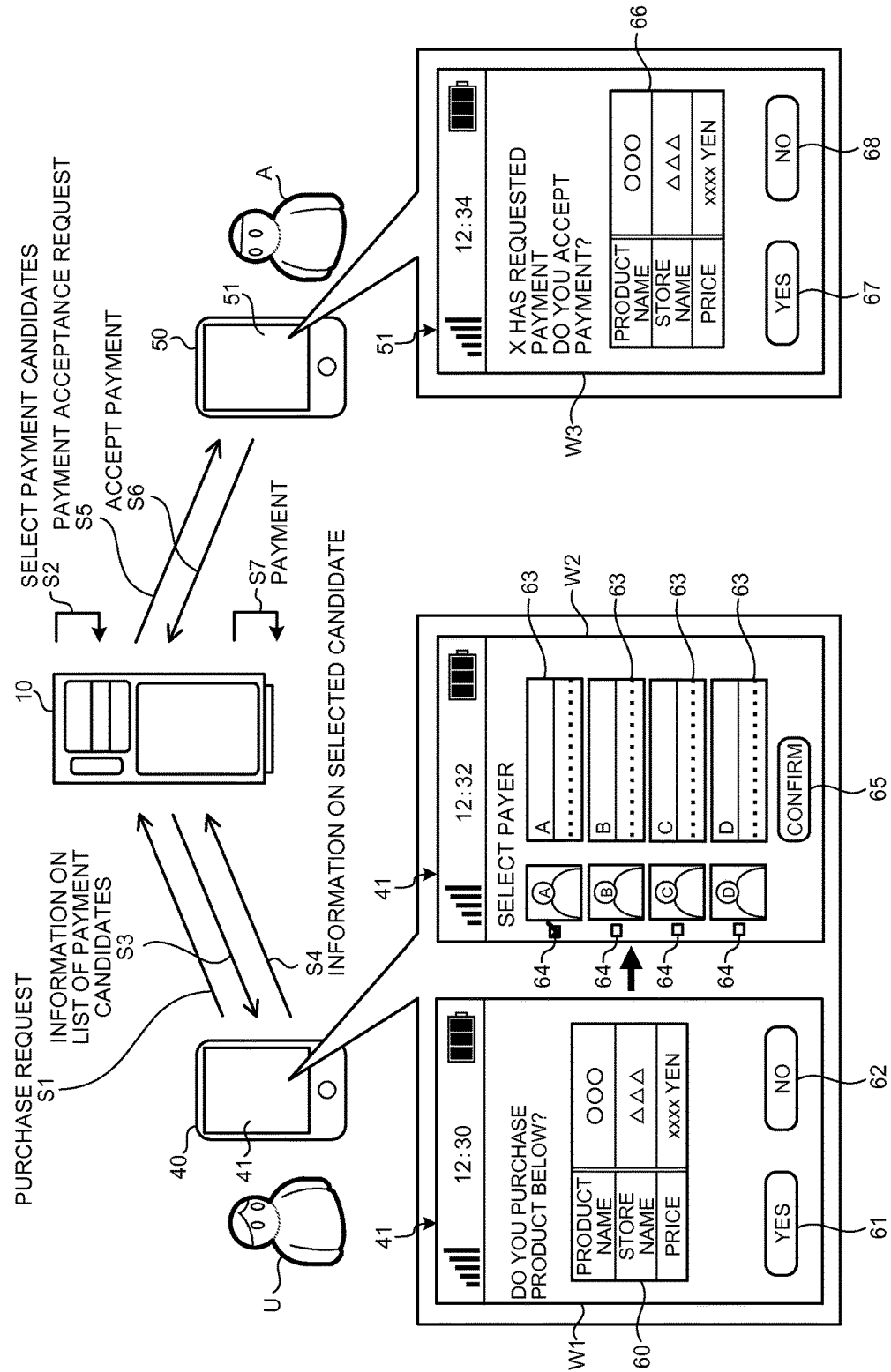
FIG. 1 is a diagram illustrating an outline of a process performed by a payment management apparatus according to an embodiment.

First, with reference to FIG. 1, an example of a process performed by a payment management apparatus 10 according to an embodiment will be described. FIG. 1 is a diagram illustrating an outline of the process performed by the payment management apparatus 10 according to the embodiment.

The payment management apparatus 10 is a server or the like that transmits and receives various kinds of information to and from terminal devices 40 and 50 via the Internet or the like to provide a web page of, for example, an electronic commerce (EC) site, and performs a payment process for a transaction. The web page is, for example, a web page of a shopping site or an auction site through which it is possible to purchase products over the Internet.

The payment management apparatus 10 need not be a stand-alone processing apparatus, but may be realized by cooperation of a plurality of processing apparatuses, such as a cloud system. Further, the function to provide a web page of an electronic commerce (EC) site and the function to process payment in the payment management apparatus 10 may be distributed to and implemented by different servers, for example.

The terminal devices 40 and 50 are information processing apparatuses with functions to communicate with the payment management apparatus 10. An arbitrary information processing apparatus, such as a smartphone, a tablet terminal, a personal digital assistant (PDA), a personal computer, or a game console, may be employed as the terminal devices 40 and 50. Further, the terminal devices 40 and 50 can communicate with the payment management apparatus 10 by connecting to a network N (see FIG. 2) via a wireless communication network, such as 3rd Generation (3G), 4th Generation (4G), Long-Term Evolution (LTE), or Global System for Mobile communication (GSM) (registered trademark), or via a near field wireless communication, such as Bluetooth (registered trademark) or a wireless local area network (LAN). The terminal devices 40 and 50 can communicate with each other through the network N.

The terminal device 40 is used by a user U, and the terminal device 50 is used by a selected candidate A (to be described later). Therefore, in the following, the terminal device 40 may be referred to as the "user terminal 40", and the terminal device 50 may be referred to as the "selected candidate terminal 50".

It is assumed that the user U of the user terminal 40 wants to purchase a product through a web page of an EC site. In this case, the user U may request a person, such as a parent, a brother, or a friend, other than him/herself to pay the price of the product on behalf of the user U.

In the above-described case, in the conventional technology, for example, information on a relationship between a person to be requested and the user U is registered in a payment management apparatus in advance, and the payment management apparatus makes payment by using payment information on the registered person (for example, information on a credit card or the like). Therefore, in the conventional technology, it is only possible to request a person registered in advance to make payment, and there is a room for improvement in the convenience.

Therefore, the payment management apparatus 10, upon receiving a purchase request from the user terminal 40, selects a plurality of payment candidates and transmits information on a list of the payment candidates to the user terminal 40. The payment management apparatus 10 acquires, from the user terminal 40, information on the selected candidate A who is selected from among the payment candidates through an operation by the user U, and performs a payment process based on the acquired information on the selected candidate A. Consequently, in the user terminal 40 of the user U, it is possible to select a person requested to make payment from among the payment candidates, enabling to improve the convenience of the payment process.

In the example illustrated in FIG. 1, when the user U attempts to purchase a product through a web page of an EC site for example, a purchase confirmation screen W1 for confirming purchase intention is displayed on a screen 41 of the user terminal 40. In this example, it is assumed that a product is purchased; however, it may be possible to purchase a service. The product and the service are examples of an object to be purchased.

On the purchase confirmation screen W1, for example, information on the product, such as a product name, a store name, and the amount of money for the product (hereinafter, also referred to as a "price") is displayed in a region 60. Further, on the purchase confirmation screen W1, a button 61 for confirming the purchase intention of the user U and a button 62 for cancelling a purchase of the product are displayed.

For example, when the user U presses the button 61 to confirm the purchase intention, the user terminal 40 transmits a purchase request for a product to the payment management apparatus 10, and the payment management apparatus 10 receives the transmitted purchase request (Step S1). The purchase request includes various kinds of information related to payment, such as an orderer of the product (that is, the user U), a store name, and a price.

Subsequently, the payment management apparatus 10 selects a plurality of payment candidates A, B, C, and D as candidates for a payer who makes payment of the price for the product corresponding to the purchase request on behalf of the user U (Step S2). In the example illustrated in FIG. 1, the payment management apparatus 10 selects the four users A to D as the payment candidates A to D, for example. However, the number of persons is not limited to this example, and one or more persons are satisfactory. It may be possible to include the user U in the payment candidates.

The payment management apparatus 10 selects the payment candidates based on, for example, relation information indicating relationships between the user U and other persons, or history information indicating past payment records or the like. For example, the payment management apparatus 10 may select, as a payment candidate, a user highly related to the user U based on the relation information, or preferentially select a user who has made a number of payments in the past based on the history information. The relation information and the history information will be described in detail later.

The payment management apparatus 10 notifies the user terminal 40 of the information on the list of the selected payment candidates A to D (Step S3). Therefore, a selection screen W2 for selecting a payer from the list of the payment candidates A to D is displayed on the screen 41 of the user terminal 40.

On the selection screen W2, the list of the payment candidates A to D and pieces of information on the respective payment candidates A to D are displayed in regions 63. The pieces of information on the respective payment candidates A to D are, for example, pieces of history information or the like. Further, on the selection screen W2, checkboxes 64 corresponding to the respective payment candidates A to D and a determination button 65 for determining a selection by the user U are displayed.

In the example in FIG. 1, it is assumed that the user U selects the checkbox 64 corresponding to the payment candidate A and presses the determination button 65. That is, it is assumed that the user U requests the payment candidate A to make payment for the product.

Accordingly, the user terminal 40 transmits information on the selected payment candidate A as information on the selected candidate A to the payment management apparatus 10, and the payment management apparatus 10 acquires the transmitted information on the selected candidate A (Step S4). That is, the selected candidate A and the payment candidate A is the same person.

Subsequently, the payment management apparatus 10 transmits, to the selected candidate terminal 50 of the selected candidate A, a payment acceptance request to request "payment acceptance" such that the selected candidate A makes payment of the price for the product on behalf of the user U (Step S5). Therefore, a payment acceptance screen W3 is displayed on a screen 51 of the selected candidate terminal 50.

On the payment acceptance screen W3, information on the product, such as a product name, a store name, and the price, is displayed in a region 66. Further, on the payment acceptance screen W3, a button 67 for confirming the intention of the payment acceptance by the selected candidate A and a button 68 for denying the payment acceptance are displayed.

When the selected candidate A presses the button 67 to confirm the intention of the payment acceptance, the selected candidate terminal 50 transmits information indicating the payment acceptance to the payment management apparatus 10 (Step S6).

The payment management apparatus 10, upon receiving the information indicating the payment acceptance, performs a payment process for the product based on payment information on the selected candidate A (Step S7).

Incidentally, when the selected candidate A presses the button 68, the selected candidate terminal 50 transmits information on denial of the payment acceptance to the payment management apparatus 10. Then, the payment management apparatus 10, upon receiving the information on the denial of the payment acceptance, transmits information indicating that the payment is not accepted to the user terminal 40 and does not perform the payment process, although not illustrated in the drawing.

In this manner, the payment management apparatus 10 selects the plurality of the payment candidates A to D, transmits the information on the list to the user terminal 40, and performs the payment process based on the information on the selected candidate A who is selected from among the payment candidates A to D by the user U. Therefore, in the user terminal 40 of the user U, it is possible to select a person requested to make payment from among the payment candidates A to D, enabling to improve the convenience of the payment process.

Further, the payment management apparatus 10 transmits the payment acceptance request to the selected candidate terminal 50 upon acquiring the information on the selected candidate A, and performs the payment process based on the information on the selected candidate A upon receiving information indicating the payment acceptance from the selected candidate terminal 50. Therefore, the payment management apparatus 10 can perform the payment process after confirming the intention of the selected candidate A to make payment.

2. Configuration of Payment Management System

Figure 2:
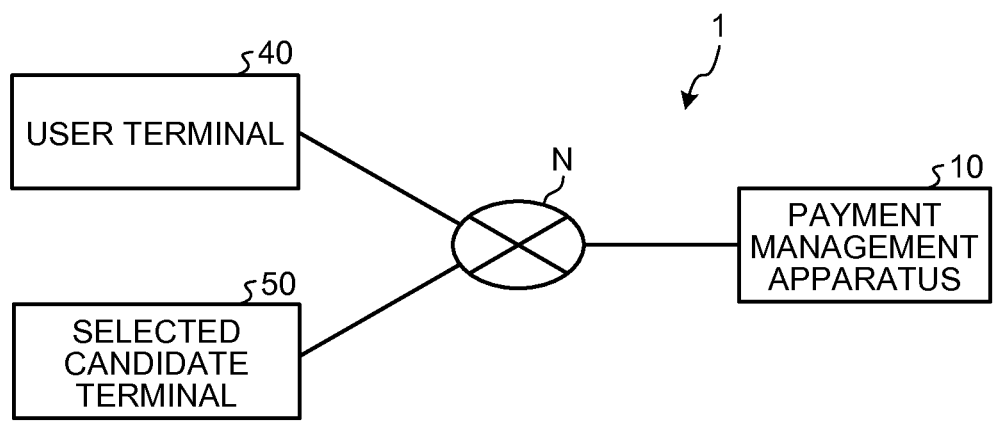
FIG. 2 is a diagram illustrating a configuration example of a payment management system according to the embodiment.

Next, with reference to FIG. 2, a configuration of a payment management system 1 according to the embodiment will be described. FIG. 2 is a diagram illustrating a configuration example of the payment management system 1 according to the embodiment. As illustrated in FIG. 2, the payment management system 1 according to the embodiment includes the payment management apparatus 10, the user terminal 40, and the selected candidate terminal 50.

The payment management apparatus 10, the user terminal 40, and the selected candidate terminal 50 are connected so as to communicate with one another via the network N as described above. The network N is, for example, a wide area network (WAN), such as the Internet. Configuration examples of the user terminal 40, the selected candidate terminal 50, and the payment management apparatus 10 will be described in this order below.

3. Configuration Example of User Terminal

Figure 3:
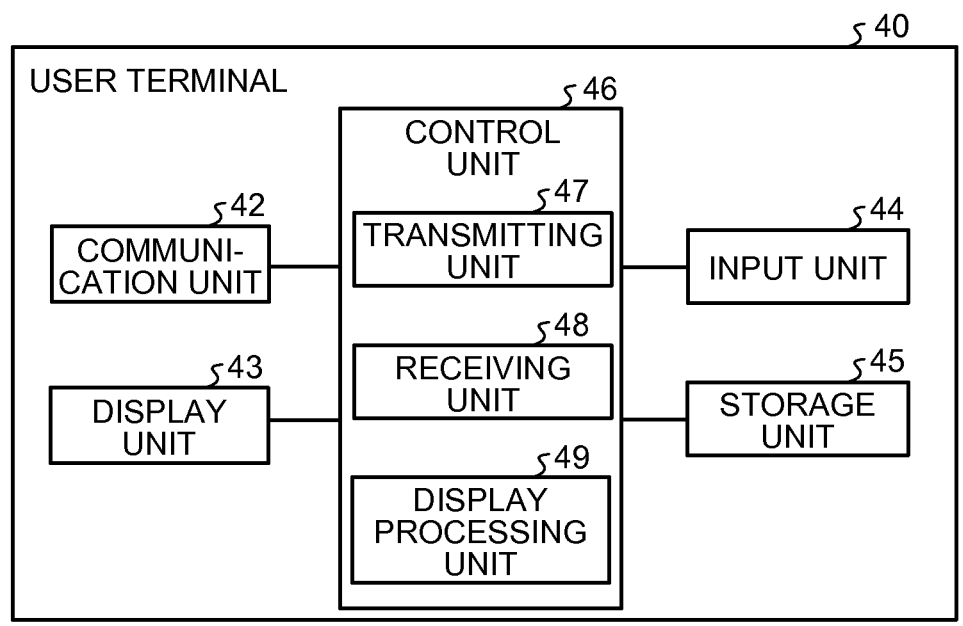
FIG. 3 is a diagram illustrating a configuration example of a user terminal according to the embodiment.

FIG. 3 is a diagram illustrating a configuration example of the user terminal 40 according to the embodiment. As illustrated in FIG. 3, the user terminal 40 includes a communication unit 42, a display unit 43, an input unit 44, a storage unit 45, and a control unit 46.

3.1. Configuration Example of Communication Unit

The communication unit 42 is a communication interface for communicating with the payment management apparatus 10 via the network N, and is realized by, for example, a network interface card (NIC) or the like.

3.2. Configuration Example of Display Unit

The display unit 43 is a display device that displays various kinds of information, and includes the screen 41 as described above (see FIG. 1). For example, the display unit 43 is a liquid crystal display (LCD) or an organic electroluminescence (EL) display. The display unit 43 may be a touch panel display.

3.3. Configuration Example of Input Unit

The input unit 44 is an input device that receives various operations from the user U. The input unit 44 includes, for example, buttons or the like for inputting letters, numbers, and the like. If the display unit 43 is a touch panel display, a part of the display unit 43 functions as the input unit 44.

3.4. Configuration Example of Storage Unit

The storage unit 45 is realized by, for example, a semiconductor memory device such as a random access memory (RAM) or a flash memory, or a storage device such as a hard disk or an optical disk. The storage unit 45 stores therein various programs and setting data. The storage unit 45 also stores therein other kinds of information acquired from the payment management apparatus 10.

3.5. Configuration Example of Control Unit

The control unit 46 is realized by, for example, executing various programs stored in the storage unit 45 by a central processing unit (CPU), a micro processing unit (MPU), or the like by using a RAM as a work area. Further, the control unit 46 is realized by, for example, an integrated circuit, such as an application specific integrated circuit (ASIC) or a field programmable gate array (FPGA).

As illustrated in FIG. 3, the control unit 46 includes a transmitting unit 47, a receiving unit 48, and a display processing unit 49, and realizes or implements functions and operations of a payment process as described below. The transmitting unit 47 transmits a product purchase request and information on a selected candidate selected by the user U to the payment management apparatus 10 in accordance with operations on the input unit 44 performed by the user U.

The receiving unit 48 receives information on the purchase confirmation screen W1 and information on the list of payment candidates, which are transmitted from the payment management apparatus 10, and stores the received information in the storage unit 45. The display processing unit 49 outputs and displays the purchase confirmation screen W1 (see FIG. 1) stored in the storage unit 45 onto the display unit 43, or outputs and displays the selection screen W2 (see FIG. 1) corresponding to the list of the payment candidates onto the display unit 43.

4. Configuration Example of Selected Candidate Terminal

Figure 4:
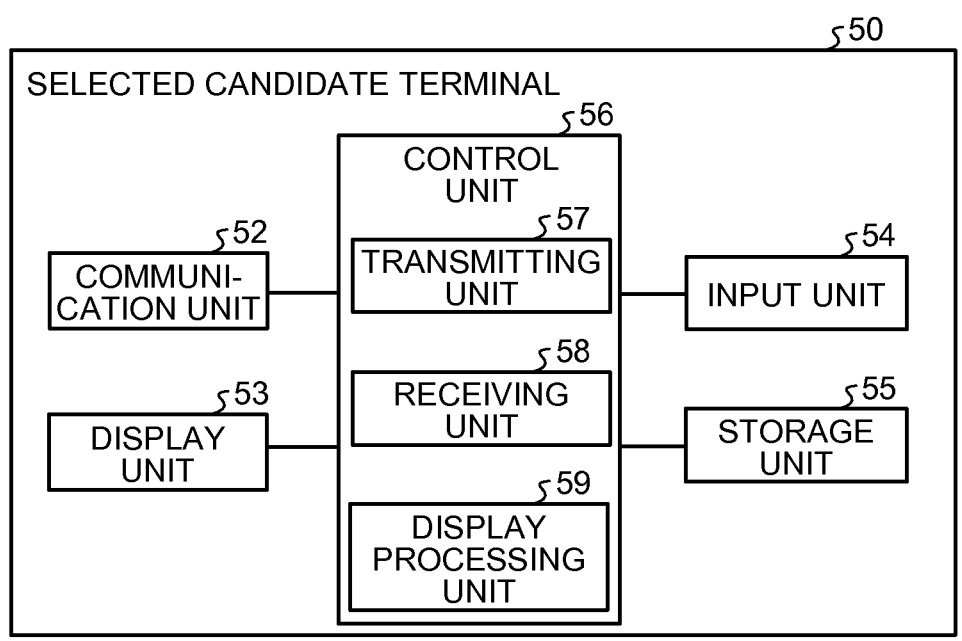
FIG. 4 is a diagram illustrating a configuration example of a selected candidate terminal according to the embodiment.

FIG. 4 is a diagram illustrating a configuration example of the selected candidate terminal 50 according to the embodiment. As illustrated in FIG. 4, the selected candidate terminal 50 includes, similar to the user terminal 40, a communication unit 52, a display unit 53, an input unit 54, a storage unit 55, and a control unit 56. The selected candidate terminal 50 and the user terminal 40 are configured in the same manner in this example; however, it is possible to configure them in a different manner.

4.1. Configuration Example of Communication Unit

The communication unit 52 is a communication interface for communicating with the payment management apparatus 10 via the network N. For example, the communication unit 52 is realized by a NIC or the like.

4.2. Configuration Example of Display Unit

The display unit 53 is a display device that displays various kinds of information. The display unit 53 includes the screen 51 (see FIG. 1) as described above, and is an LCD or an organic EL display, for example. The display unit 53 may be a touch panel display.

4.3. Configuration Example of Input Unit

The input unit 54 is an input device that receives various operations from the selected candidate A, and includes, for example, buttons or the like for inputting letters, numbers, and the like. If the display unit 53 is a touch panel display, a part of the display unit 53 functions as the input unit 54.

4.4. Configuration Example of Storage Unit

The storage unit 55 is realized by, for example, a semiconductor memory device such as a RAM or a flash memory, or a storage device such as a hard disk or an optical disk. The storage unit 55 stores therein various programs, setting data, and other kinds of information acquired from the payment management apparatus 10.

4.5. Configuration Example of Control Unit

The control unit 56 is realized by, for example, executing various programs stored in the storage unit 55 by a CPU, an MPU, or the like by using a RAM as a work area. Further, the control unit 56 is realized by, for example, an integrated circuit, such as an ASIC or an FPGA.

The control unit 56 includes a transmitting unit 57, a receiving unit 58, and a display processing unit 59, and realizes or implements functions and operations of the payment process as described below. The receiving unit 58 receives information on a payment acceptance request transmitted from the payment management apparatus 10, and stores the received information in the storage unit 55. The display processing unit 59 outputs and displays the payment acceptance screen W3 (see FIG. 1) corresponding to the information on the payment acceptance request stored in the storage unit 55 onto the display unit 53.

The transmitting unit 57 transmits, for example, information on payment acceptance selected through the payment acceptance screen W3 or information on denial of the payment acceptance to the payment management apparatus 10 in accordance with operations on the input unit 54 performed by the selected candidate A.

The internal configurations of the control unit 46 of the user terminal 40 and the control unit 56 of the selected candidate terminal 50 as described above are not limited to the configurations illustrated in FIGS. 3 and 4, and other configurations may be employed as long as the payment process is performed. Further, the connection relationships of the processing units of the control unit 46 and the control unit 56 are not limited to the connection relationships illustrated in FIGS. 3 and 4, and other connection relationships may be employed.

5. Configuration Example of Payment Management Apparatus

Figure 5:
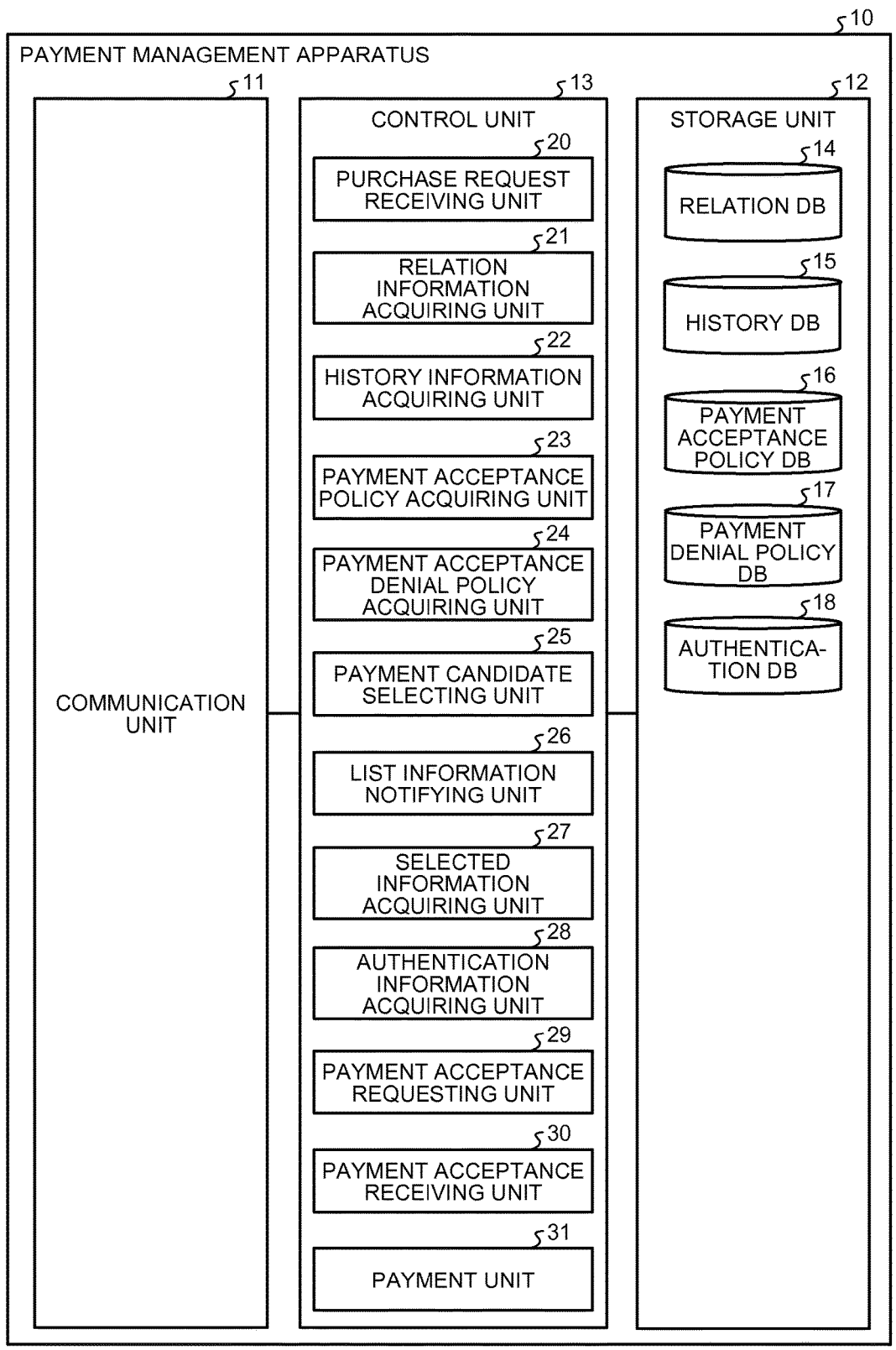
FIG. 5 is a diagram illustrating a configuration example of the payment management apparatus according to the embodiment.

FIG. 5 is a diagram illustrating a configuration example of the payment management apparatus 10 according to the embodiment. In the following, a "database" is described as a "DB". As illustrated in FIG. 5, the payment management apparatus 10 includes a communication unit 11, a storage unit 12, and a control unit 13.

5.1. Configuration Example of Communication Unit

The communication unit 11 is a communication interface for communicating with the user terminal 40 and the selected candidate terminal 50 via the network N, and is, for example, an interface such as a NIC.

5.2. Configuration Example of Storage Unit

The storage unit 12 is realized by, for example, a semiconductor memory device such as a RAM or a flash memory, or a storage device such as a hard disk or an optical disk. The storage unit 12 stores therein a relation DB 14, a history DB 15, a payment acceptance policy DB 16, a payment acceptance denial policy DB 17, and an authentication DB 18.

In the relation DB 14, relation information used for a process of selecting payment candidates is registered. The relation information is information indicating relationships between the user U and other persons, and is, for example, information on a social graph. The relation information is not limited to the information on the social graph, and may be, for example, a directory (hereinafter, may be referred to as a "company directory) including information on persons or departments related to the user U in an organization (for example, a company) to which the user U belongs.

Figure 6:
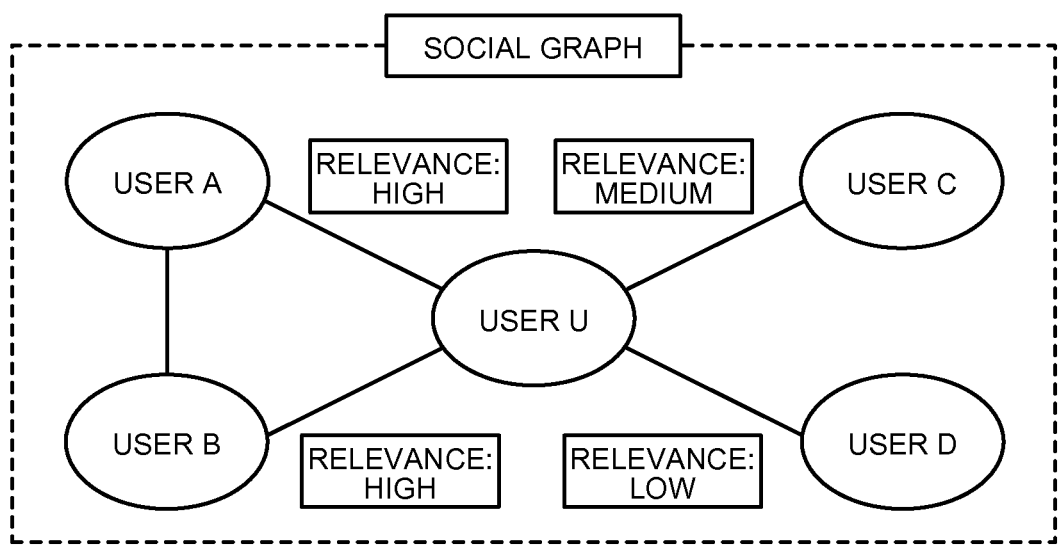
FIG. 6 is a diagram illustrating an example of a social graph.

FIG. 6 is a diagram illustrating an example of the social graph. As illustrated in FIG. 6, the social graph is a graph indicating the relationships between the user U and other persons (for example, the users A to D). The social graph is calculated with various parameters indicating relationships with the user U. For example, the social graph is calculated from information on predetermined relationships with the user U (for example, a family, a friend, a lover, or the like), relationships between members in a social networking service (SNS) over the Internet (for example, relationships with friends), an age, an occupation, an address, a hobby, or the like.

In the example illustrated in FIG. 6, the users A and B are family members of the user U and have the highest relevance. Further, the users C and D are friends of the user U, and the relevance is reduced in order of the user C and the user D.

Referring back to FIG. 5, explanation is continued. In the history DB 15, history information indicating payment records, such as payments accepted in the past, is registered. FIG. 7 is a diagram illustrating an example of a history table stored in the history DB 15.

As illustrated in FIG. 7, the history table includes pieces of information such as a "user ID", a "number of payment acceptance requests", a "number of payment acceptances", an "acceptance rate", a "product type/content", a "price", a "purchase time", and a "store name/store type", and the pieces of the information are associated with one another.

The "user ID" is identification information assigned to each user. It is assumed here that, for example, a user ID "A" is a piece of identification information on the user A, and user IDs "B", "C", and "D" are pieces of identification information on the users B, C, and D, respectively.

The "number of payment acceptance requests" is information indicating the number of payment acceptance requests received by a terminal device of a corresponding user. In the example illustrated in FIG. 7, it is indicated that the terminal device of the user A (that is, the selected candidate terminal 50 of the selected candidate A) has received twenty payment acceptance requests.

The "number of payment acceptances" is information on the number of payments accepted by the terminal device of the corresponding user in response to the received payment acceptance requests. In the example illustrated in FIG. 7, it is indicated that the terminal device of the user A has accepted eighteen payments.

The "acceptance rate" is information indicating a rate of the number of payment acceptances with respect to the number of the payment acceptance requests. In the example illustrated in FIG. 7, it is indicated that the acceptance rate of the terminal device of the user A is 90%.

The "product type/content" is information indicating a type and a content of a product for which the payments has been accepted. For example, the product type includes information on an attribute of the product, such as a "book" or a "musical instrument", and the product content includes detailed information on the product, such as a "title of book" or a "name of musical instrument".

The "price" is information indicating a price of the product for which the payment has been accepted and the payment process has been performed. In the example illustrated in FIG. 7, information on a price range from the lowest price to the highest price of the product is stored. Specifically, for example, it is indicated that the terminal device of the user A has performed the payment process on products in the price range from 1000 to 20000 yen. Incidentally, the "price" in the history information is not limited to the price range, and may be, for example, an average or a median of prices of products subjected to the payment process.

The "purchase time" is information on a date in which the payment has been accepted and the payment process has been performed. The "store name/store type" is information indicating a name and a type of a store in which the product has been purchased. The store type means, for example, information on an attribute of a business configuration of the store, such as a "bookstore" or a "department store".

Referring back to FIG. 5, in the payment acceptance policy DB 16, information on a payment acceptance policy is registered, which indicates a condition for automatically accepting the payment in response to the payment acceptance request. Specifically, the "payment acceptance policy" is a condition for directly performing the payment process in response to a purchase request without transmitting a payment acceptance request to the selected candidate or without obtaining a payment acceptance directly from the selected candidate as will be described later. Therefore, for example, it is assumed that the users A, B, C, and D who can be payment candidates or selected candidates set and register payment acceptance policies in the payment acceptance policy DB 16 in advance through the respective terminal devices.

FIG. 8 is a diagram illustrating an example of a payment acceptance policy table stored in the payment acceptance policy DB 16.

As illustrated in FIG. 8, the payment acceptance policy table includes pieces of information on a "user ID", a "user name", a "product type/content", an "upper limit of price", a "purchase time", a "store name/store type", and a "time limit for payment acceptance", and the pieces of the information are associated with one another.

The "user ID" in this example is information indicating a user who has registered information on the payment acceptance policy. Specifically, in the example illustrated in FIG. 8, the "user ID" indicates the users A to D who can be the payment candidates or the selected candidates.

The "user name" is information on a user to whom the payment acceptance policy is applied. In the example illustrated in FIG. 8, the "user U" is registered in all fields.

The "product type/content" is information on a type and a content of a product for which the payment is automatically accepted. In the example illustrated in FIG. 8, it is indicated that the user A has set the product type/content to "book". The "upper limit of price" is information indicating the upper limit of the price for which the payment is automatically accepted. In the example illustrated in FIG. 8, it is indicated that the user A has set the upper limit to "10000 yen".

The "purchase time" is information indicating a purchase time at which the payment is automatically accepted. Specifically, for example, the date of issue of a periodically-published book or the like may be registered. The "store name/store type" is information indicating a name of a store or an attribute of a business configuration of the store for which the payment is automatically accepted. The "time limit for payment acceptance" is information indicating a time limit to automatically accept the payment.

In this manner, the information on the payment acceptance policy includes at least one piece of information on the user, a type and a content of an object to be purchased, an upper limit of the price of the object to be purchased, a timing to purchase the object to be purchased, a store in which the purchase is performed, the type of the store, or a period in which the payment is accepted. Therefore, it becomes possible to set various conditions as the payment acceptance policy, enabling to further improve the convenience of the payment process in the payment management apparatus 10.

Incidentally, in this example, it is assumed that when the content of the purchase request meets all of the above-described conditions such as the "product type/content" and the "upper limit of price", the payment is automatically accepted; however, it is not limited thereto. Specifically, for example, it may be possible to automatically perform the payment process when a part of the content of the purchase request meets the above-described conditions.

Referring back to FIG. 5, explanation is continued. In the payment acceptance denial policy DB 17, information on a payment acceptance denial policy is registered, which indicates a condition for denying the payment acceptance in response to a payment acceptance request with a content of a purchase request. Specifically, the "payment acceptance denial policy" is a condition under which the users A, B, C, and D who can be the payment candidates cannot accept the payment.

Therefore, for example, the users A to D who can be the payment candidates set and register the payment acceptance denial policies in the payment acceptance denial policy DB 17 in advance through the respective terminal devices. If the purchase request from the user terminal 40 meets the payment acceptance denial policy as will be described later, a user who has set the payment acceptance denial policy is excluded from the payment candidates.

FIG. 9 is a diagram illustrating an example of a payment acceptance denial policy table stored in the payment acceptance denial policy DB 17.

As illustrated in FIG. 9, the payment acceptance denial policy table includes pieces of information on a "user ID", a "user name", a "product type/content", a "price", a "purchase time", a "store name/store type", and a "time limit for denial of payment acceptance", and the pieces of the information are associated with one another.

The "user ID" in this example is information indicating a user who has registered information on the payment acceptance denial policy. Specifically, in the example illustrated in FIG. 9, the "user ID" indicates the users A, B, C, and D who can be the payment candidates.

The "user name" is information on a user to whom the payment acceptance denial policy is applied. In the example illustrated in FIG. 9, the "user U" is registered in all fields.

The "product type/content" is information on a type and a content of a product for which the payment cannot be accepted. In the example illustrated in FIG. 9, it is indicated that the user A has set the product type/content to "toy".

The "price", the "purchase time", the "store name/store type", the "time limit for denial of payment acceptance" are pieces of information on a price, a purchase time, a name of a store, an attribute of a business configuration of the store, and a time limit as to the product for which the payment cannot be accepted.

Incidentally, in this example, it is assumed that when the content of the purchase request meets all of the above-described conditions such as the "product type/content" and the "price", a user who has set the conditions is excluded from the payment candidates; however, it is not limited thereto. Specifically, for example, it may be possible to exclude a corresponding user from the payment candidates when a part of the content of the purchase request meets the above-described conditions of the payment acceptance denial policy.

Referring back to FIG. 5, explanation is continued. In the authentication DB 18, authentication information for authenticating the user terminal 40 is registered. As the authentication information, for example, an electronic signature of the user terminal 40 or the like may be used.

5.3. Configuration Example of Control Unit

The control unit 13 is realized by, for example, executing various programs stored in a storage device in the control unit 13 by a CPU, an MPU, or the like by using a RAM as a work area. Further, the control unit 13 is realized by, for example, an integrated circuit, such as an ASIC or an FPGA.

As illustrated in FIG. 5, the control unit 13 includes a purchase request receiving unit 20, a relation information acquiring unit 21, a history information acquiring unit 22, a payment acceptance policy acquiring unit 23, a payment acceptance denial policy acquiring unit 24, a payment candidate selecting unit 25, a list information notifying unit 26, a selected information acquiring unit 27, an authentication information acquiring unit 28, a payment acceptance requesting unit 29, a payment acceptance receiving unit 30, and a payment unit 31. The internal configuration of the control unit 13 is not limited to the configuration illustrated in FIG. 5, and other configurations may be employed as long as the payment process to be described later is performed. Further, the connection relationships of the processing units of the control unit 13 are not limited to the connection relationships illustrated in FIG. 5, and other connection relationships may be employed.

The purchase request receiving unit 20 receives a purchase request transmitted from the user terminal 40. The purchase request receiving unit 20 notifies the payment candidate selecting unit 25, the payment acceptance requesting unit 29, and the payment unit 31 of information on the received purchase request.

The relation information acquiring unit 21 acquires relation information from the relation DB 14. The relation information acquiring unit 21 notifies the payment candidate selecting unit 25 of the acquired relation information.

The history information acquiring unit 22 acquires history information from the history DB 15. The history information acquiring unit 22 notifies the payment candidate selecting unit 25 of the acquired history information.

The payment acceptance policy acquiring unit 23 acquires information on the payment acceptance policy from the payment acceptance policy DB 16. The payment acceptance policy acquiring unit 23 notifies the payment candidate selecting unit 25, the payment acceptance requesting unit 29, and the payment unit 31 of the acquired information on the payment acceptance policy.

The payment acceptance denial policy acquiring unit 24 acquires information on the payment acceptance denial policy from the payment acceptance denial policy DB 17. The payment acceptance denial policy acquiring unit 24 notifies the payment candidate selecting unit 25 of the acquired information on the payment acceptance denial policy.

The payment candidate selecting unit 25 selects a plurality of the payment candidates A to D who pay the price for a product corresponding to the purchase request on behalf of the user U of the user terminal 40. The list information notifying unit 26 notifies the user terminal 40 of information on the list of the payment candidates A to D selected by the payment candidate selecting unit 25.

Figure 10:
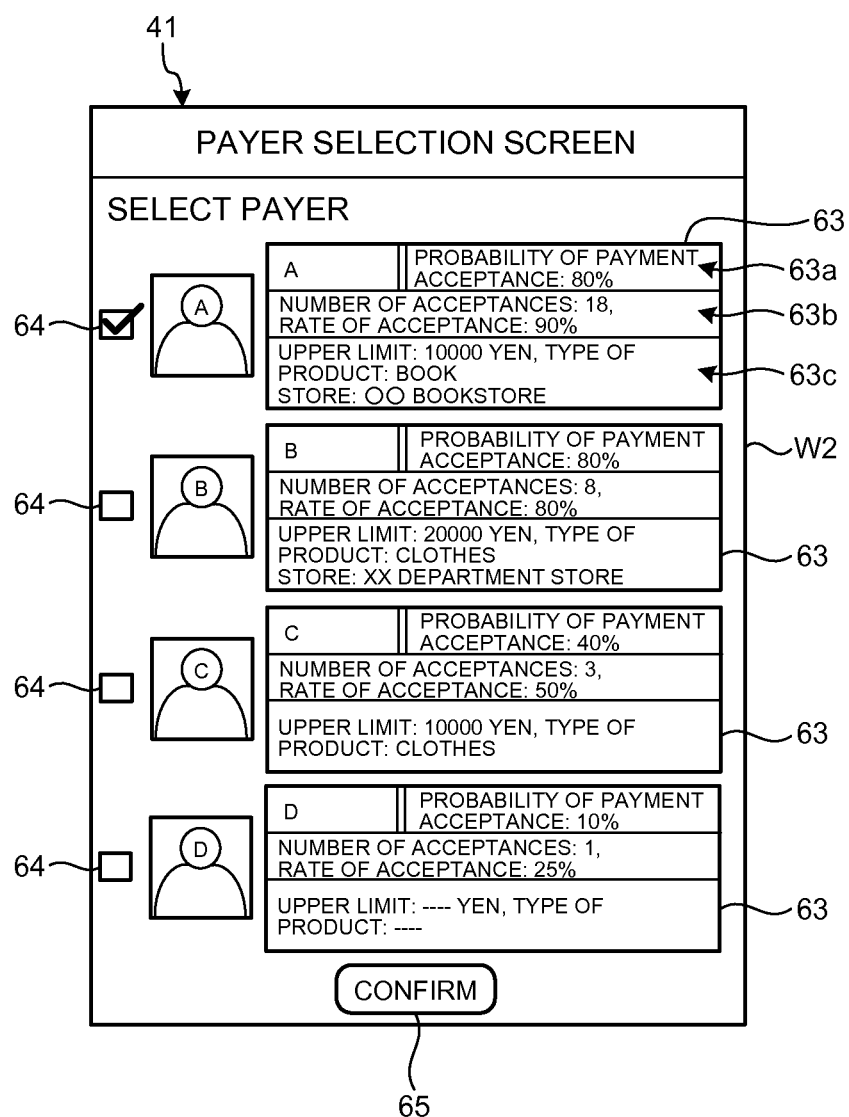
FIG. 10 is a diagram illustrating an example of a selection screen displayed on a screen of a display unit of the user terminal.

Accordingly, the selection screen W2 including the information on the list of the payment candidates A to D is displayed on the screen 41 of the display unit 43 of the user terminal 40. FIG. 10 is a diagram illustrating an example of the selection screen W2 displayed on the screen 41 of the display unit 43 of the user terminal 40.

A selection of the payment candidates A to D by the payment candidate selecting unit 25 will be described below. The payment candidate selecting unit 25 may select a plurality of the payment candidates A to D based on the relation information (for example, information on the social graph).

Specifically, it is often the case that a user who has a close relationship with the user U is likely to accept the payment in response to the payment acceptance request from the user terminal 40 of the user U. Further, as described above, the social graph is a graph indicating the relationships with the user U.

Therefore, the payment candidate selecting unit 25 selects the payment candidates A, B, C, and D in order of the highest relevance to the user U, that is, in order of the users A, B, C, and D, from among a plurality of users. In this manner, the payment management apparatus 10 can select persons related to the user U as the payment candidates. Consequently, it is possible to reduce the time and effort to select payment candidates with respect to the user U.

On the selection screen W2, for example, a list is displayed in order of selection by the payment candidate selecting unit 25. Therefore, the payment management apparatus 10 can display the payment candidates A, B, C, and D in order from the highest probability of the payment acceptance.

Incidentally, the relevance of the payment candidate A and the relevance of the payment candidate B with respect to the user U are the same; therefore, the payment candidates A and B may be displayed in reverse order. Further, a display method of the selection screen W2 is not limited to the method as described above. Specifically, for example, on the selection screen W2, it may be possible to change display sizes of the payment candidates, change the colors of the payment candidates, or apply blinking display to the payment candidates in order of the highest probability of the payment acceptance.

Further, the payment candidate selecting unit 25 may select a plurality of the payment candidates A to D based on the history information, for example. Specifically, it is often the case that a user who has made payment as indicated by the number of payment acceptances is likely to accept the payment in response to the payment acceptance request from the user terminal 40 of the user U.

Therefore, the payment candidate selecting unit 25 selects the payment candidates A, B, C, and D in order of the largest number of past histories, such as payments, that is, in order of the users A, B, C, and D, from among a plurality of users. In this manner, for example, the payment management apparatus 10 can select persons who have made payment in the past as the payment candidates. Consequently, it is possible to reduce the time and effort to select payment candidates with respect to the user U.

On the selection screen W2, for example, a list is displayed in order of selection by the payment candidate selecting unit 25. Therefore, the payment management apparatus 10 can display the payment candidates A, B, C, and D in order from the highest probability of the payment acceptance.

Furthermore, for example, the payment candidate selecting unit 25 may preferentially select a payment candidate corresponding to the payment acceptance policy when the content of the purchase request meets the payment acceptance policy.

Specifically, when the content of the purchase request from the user terminal 40 of the user U meets the payment acceptance policy, and if the payment candidate who has set the payment acceptance policy is selected as a payer by the user U, the payment process is automatically performed. In this manner, the payment candidate selecting unit 25 can promptly perform the payment process in response to the purchase request by preferentially selecting the payment candidate as described above.

Moreover, for example, when the content of the purchase request from the user terminal 40 of the user U meets the payment acceptance denial policy, the payment candidate selecting unit 25 may exclude a payment candidate corresponding to the payment acceptance denial policy.

Specifically, the payment acceptance denial policy is a condition under which the payment candidates cannot accept the payment. Therefore, even if the payment acceptance with the content of the purchase request that meets the payment acceptance denial policy is requested, the payment is less likely to be accepted.

Therefore, the payment candidate selecting unit 25 may not select but exclude a payment candidate who is less likely to accept the payment in response to the payment acceptance request. Consequently, the payment candidate selecting unit 25 can reduce the time and effort to select payment candidates with respect to the user U, and can select payment candidates who are likely to conduct payment acceptance.

The explanation on FIG. 10 is continued. On the selection screen W2, pieces of information related to the respective payment candidates A to D are displayed on the regions 63. As illustrated in FIG. 10, each of the regions 63 is divided into, for example, a first region 63a, a second region 63b, and a third region 63c.

In the first region 63a, for example, information on a rank corresponding to the probability of the payment acceptance estimated based on the information on the social graph is displayed.

For example, the payment candidate selecting unit 25 estimates the probability of the payment acceptance based on the information on the social graph, and determines the rank depending on the estimated probability for each payment candidate. As described above, it is often the case that a user who has a close relationship with the user U is likely to accept the payment. Therefore, the payment candidate selecting unit 25 determines the rank in order of the payment candidates A, B, C, and D.

The payment candidate selecting unit 25 inserts information on the rank in the list of the payment candidates, and displays the information and the list. In the example illustrated in FIG. 10, a case is illustrated in which the probability of the payment acceptance by each of the payment candidates A and B is estimated as 80%, the probability of the payment acceptance by the payment candidate C is estimated as 40%, and the probability of the payment acceptance by the payment candidate D is estimated as 10%. While the probability of the payment acceptance is displayed by "%" in the above described example, it is not limited thereto. For example, the probability may be displayed by using a different method, such as a graph, a picture, or different colors.

In the second region 63b, it may be possible to display the history information, for example. In the third region 63c, it may be possible to display information on the payment acceptance policy. In this manner, by displaying the probability of the payment acceptance, the history information, and the information on the payment acceptance policy, the user U can easily determine and select a payment candidate who is likely to accept the payment. Consequently, it is possible to further improve the convenience of the payment management apparatus 10.

Referring back to FIG. 5, the explanation is continued. The selected information acquiring unit 27 acquires, as information on a selected candidate, information on a payment candidate selected from the list of the payment candidates from the user terminal 40. The selected information acquiring unit 27 notifies the payment acceptance requesting unit 29 and the payment unit 31 of the acquired information on the selected candidate. Incidentally, it is assumed here that the payment candidate A (see FIG. 10) is selected by the user U.

The authentication information acquiring unit 28 acquires authentication information from the authentication DB 18. The authentication information acquiring unit 28 notifies the payment acceptance requesting unit 29 of the acquired authentication information.

The payment acceptance requesting unit 29 determines whether the content of the purchase request meets the payment acceptance policy of the selected candidate A. The payment acceptance requesting unit 29, when determining that the content of the purchase request does not meet the payment acceptance policy, transmits a payment acceptance request to request the payment acceptance to the selected candidate terminal 50.

Further, the payment acceptance requesting unit 29 inserts the authentication information in the payment acceptance request, and transmits the payment acceptance request with the authentication information to the selected candidate terminal 50. Therefore, the selected candidate A of the selected candidate terminal 50 can confirm that the transmitted payment acceptance request is an authenticated payment acceptance request sent from the user terminal 40 of the user U.

Figure 11:
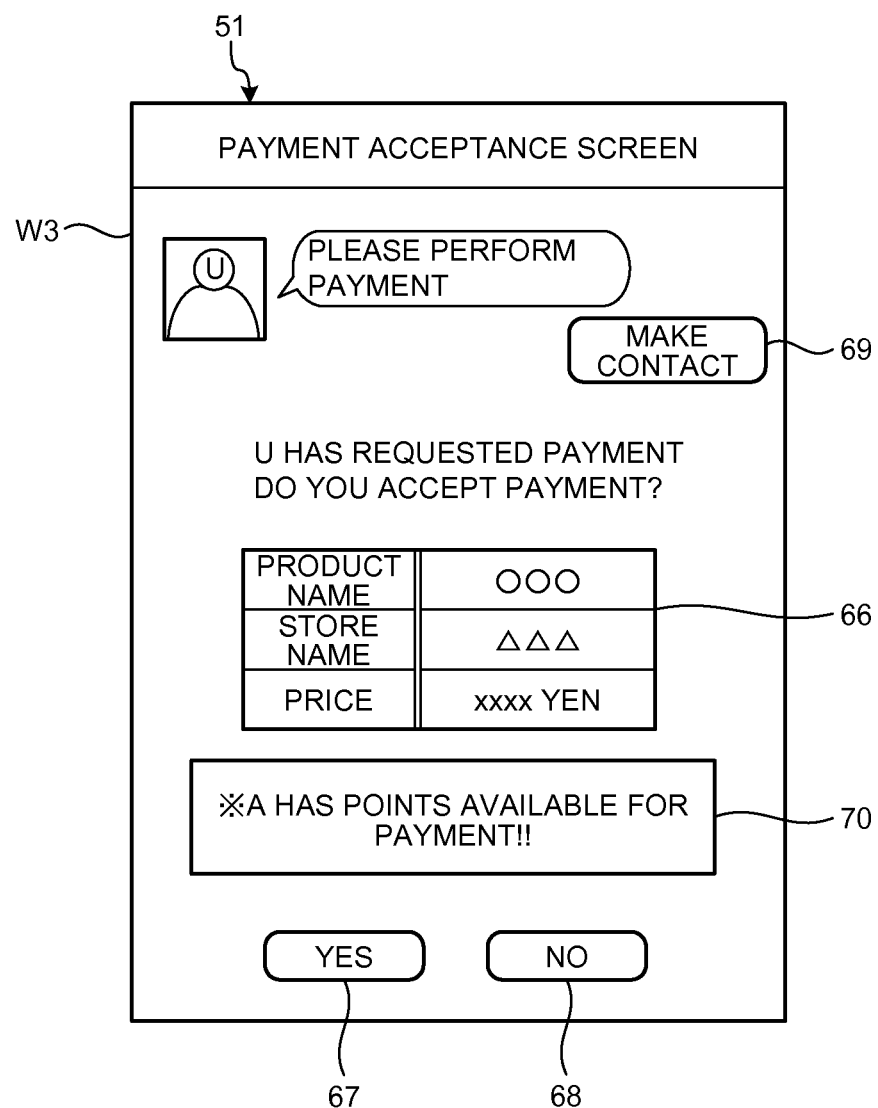
FIG. 11 is a diagram illustrating an example of a payment acceptance screen displayed on a screen of a display unit of the selected candidate terminal.

Upon transmission of the payment acceptance request as described above, the payment acceptance screen W3 is displayed on the screen 51 of the display unit 53 of the selected candidate terminal 50. FIG. 11 is a diagram illustrating an example of the payment acceptance screen W3 displayed on the screen 51 of the display unit 53 of the selected candidate terminal 50.

As illustrated in FIG. 11, on the payment acceptance screen W3, the region 66 for indicating information on the product, the button 67 for confirming the intention of the payment acceptance by the selected candidate A, and the button 68 for denying the payment acceptance are displayed.

In the above-described example, the payment acceptance requesting unit 29 includes an electronic signature as the authentication information in the payment acceptance request. However, the authentication information for authenticating the user terminal 40 is not limited to this.

Specifically, for example, the payment acceptance requesting unit 29 may display a contact button 69 on the payment acceptance screen W3 to contact the user terminal 40 of the user U. When the selected candidate A presses the contact button 69, a call, an electronic mail, or the like is sent from the selected candidate terminal 50 to the user terminal 40. Therefore, the selected candidate A can directly confirm the validity of the payment acceptance request with the user U.

Furthermore, for example, the payment acceptance requesting unit 29 may include, as the authentication information, confidential information (for example, a password or a test word) available only between the user U and the selected candidate A in the payment acceptance request, although not illustrated in the drawings.

Moreover, for example, the payment acceptance requesting unit 29 may include, as the authentication information, an access code in the payment acceptance request and transmit the payment acceptance request with the authentication information to the selected candidate terminal 50, although not illustrated in the drawings. The selected candidate A of the selected candidate terminal 50 may log in an authentication site by using the access code, and confirm the content of the purchase request and information on the user who has sent the payment acceptance request.

Furthermore, as illustrated in FIG. 11, for example, the payment acceptance requesting unit 29 may display information for assisting the selected candidate A to accept the payment on the payment acceptance screen W3. For example, the payment acceptance requesting unit 29 may display, in a region 70, a phrase such as "A (the selected candidate A) has points available for payment" or "electronic money is available", in order to assist in accepting the payment. Therefore, it is possible to motivate the selected candidate A to accept the payment so that a product transaction can be settled easily.

Incidentally, the "points" as described above are virtual values available for a service (for example, online shopping, auction, online games, or the like) provided by the payment management apparatus 10. The points may be virtual values available for other services.

In contrast, when determining that the content of the purchase request meets the payment acceptance policy, the payment acceptance requesting unit 29 does not transmit the payment acceptance request to the selected candidate terminal 50.

When the payment acceptance requesting unit 29 transmits the payment acceptance request to the selected candidate terminal 50, the payment acceptance receiving unit 30 receives, from the selected candidate terminal 50, information indicating the payment acceptance in response to the payment acceptance request. The payment acceptance receiving unit 30 notifies the payment unit 31 of the received information indicating the payment acceptance.

When the payment acceptance receiving unit 30 receives the information indicating the payment acceptance, the payment unit 31 performs the payment process on the product based on the information on the selected candidate A.

Incidentally, as described above, when the content of the purchase request meets the payment acceptance policy, the payment acceptance requesting unit 29 does not transmit the payment acceptance request, and therefore, the payment unit 31 does not receive information indicating the payment acceptance. Therefore, when the content of the purchase request meets the payment acceptance policy, the payment unit 31 performs the payment process of the product with respect to the selected candidate A as a payer.

In this manner, when the content of the purchase request meets the payment acceptance policy, the payment management apparatus 10 performs the payment process without transmitting the payment acceptance request to the selected candidate terminal 50. Therefore, it is possible to promptly conduct a product transaction. Further, it is possible to reduce the time and effort to ask the selected candidate A of the selected candidate terminal 50 to accept the payment. Consequently, it is possible to further improve the convenience of the payment management apparatus 10.

6. Flow of Payment Management Apparatus

Figure 12:
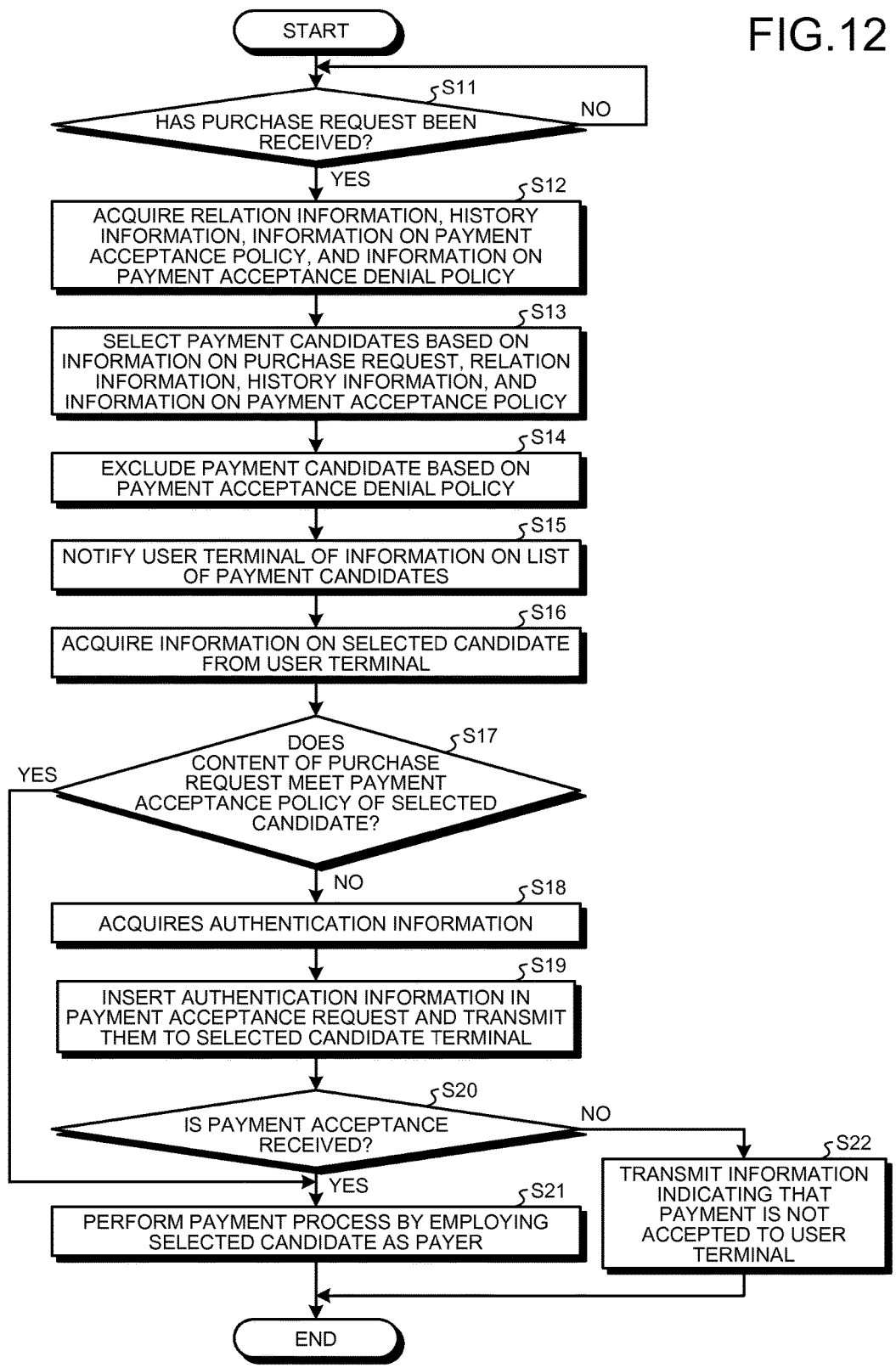
FIG. 12 is a diagram for explaining an example of the flow of a payment process performed by the payment management apparatus.

Next, an example of the flow of the payment process performed by the payment management apparatus 10 will be described. FIG. 12 is a diagram for explaining an example of the flow of the payment process performed by the payment management apparatus 10. The payment process illustrated in FIG. 12 is repeated by the control unit 13 of the payment management apparatus 10.

As illustrated in FIG. 12, the control unit 13 determines whether a purchase request has been received from the user terminal 40 (Step S11). If the purchase request has not been received (NO at Step S11), the control unit 13 returns the process to Step S11. In contrast, if the purchase request has been received (YES at Step S11), the control unit 13 acquires the relation information, the history information, the information on the payment acceptance policy, and the information on the payment acceptance denial policy (Step S12).

Subsequently, the control unit 13 selects a plurality of payment candidates based on the information on the purchase request, the relation information, the history information, and the information on the payment acceptance policy (Step S13). Then, the control unit 13 excludes a payment candidate based on the information on the payment acceptance denial policy (Step S14).

The control unit 13 notifies the user terminal 40 of information on a list of the payment candidates (Step S15). The control unit 13 acquires, from the user terminal 40, information on a payment candidate selected from the list of the payment candidates as the information on the selected candidate (Step S16).

Subsequently, the control unit 13 determines whether the content of the purchase request meets the payment acceptance policy of the selected candidate (Step S17). If the content of the purchase request does not meet the payment acceptance policy (NO at Step S17), the control unit 13 acquires authentication information (Step S18).

The control unit 13 includes the authentication information in the payment acceptance request and transmits the payment acceptance request with the authentication information to the selected candidate terminal 50 (Step S19).

Subsequently, the control unit 13 determines whether the payment acceptance is received from the selected candidate terminal 50 (Step S20).

If the payment acceptance is received from the selected candidate terminal 50 (YES at Step S20), the control unit 13 performs the payment process of the product with respect to the selected candidate A as a payer based on the information on the selected candidate A (Step S21). In contrast, if the payment acceptance is not received from the selected candidate terminal 50 (NO at Step S20), for example, if information indicating denial of the payment acceptance is received, the control unit 13 transmits information indicating that the payment is not accepted to the user terminal 40 (Step S22).

In contrast, if the content of the purchase request meets the payment acceptance policy (YES at Step S17), the control unit 13 performs the payment process without transmitting the payment acceptance request to the selected candidate terminal 50 (Step S21).

7. Modification

The payment management apparatus 10 according to the above-described embodiment may be embodied in various forms other than the above-described embodiment. Therefore, modifications of the payment management apparatus 10 will be described below.

7.1. Selected Candidate

An example has been described in which, in the payment management apparatus 10 as described above, the user U selects the one payment candidate A from the payment candidates A to D; however, it is not limited thereto.

Specifically, for example, the user U may select a plurality of payment candidates from the list of the payment candidates A to D. The selected information acquiring unit 27 of the payment management apparatus 10 may acquire information on the plurality of the selected payment candidates, as information on a plurality of selected candidates, from the user terminal 40.

In this manner, when acquiring information on the plurality of the selected candidates, the payment acceptance requesting unit 29 of the payment management apparatus 10 transmits the payment acceptance request to the selected candidate terminal of each of the selected candidates. Accordingly, for example, when receiving the payment acceptance from at least one of the selected candidate terminals from among the selected candidate terminals to which the payment acceptance requests have been transmitted, the payment management apparatus 10 performs the payment process. Therefore, it becomes possible to easily settle a product transaction. Further, it is possible to improve the convenience of the payment process by the payment management apparatus 10.

Furthermore, for example, when receiving the payment acceptances from a plurality of selected candidate terminals from among the selected candidate terminals to which the payment acceptance requests have been transmitted, the payment management apparatus 10 may distribute the payment of the price for the product to the plurality of the selected candidate terminals from which the payment acceptances are received. Therefore, it is possible to further improve the convenience of the payment process by the payment management apparatus 10.

Moreover, for example, when receiving the payment acceptances from a plurality of selected candidate terminals, the payment management apparatus 10 may employ, as a payer, a selected candidate corresponding to information indicating the payment acceptance that is firstly received, and may perform the payment process. Consequently, it is possible to promptly conduct a product transaction, and further improve the convenience of the payment process by the payment management apparatus 10.

7.2. Selection of Payment Candidate Based on Relation Information

An example has been described in which, in the payment management apparatus 10 as described above, a social graph is used as the relation information; however, it is not limited thereto. For example, if the payment management apparatus 10 as described above is applied to payment of expenses or travel expenses in companies, different kinds of information from the social graph may be used as the relation information.

An example of payment of expenses will be described below. It is assumed that, in the relation DB 14, the company directory as described above is registered as the relation information in addition to the information on the social graph or in place of the social graph. It is assumed that the company directory includes information on, for example, payment representatives or departments for performing payment in a company to which the user U belongs.

When the purchase request receiving unit 20 receives a purchase request for a product to be purchased at company expense, the relation information acquiring unit 21 acquires the company directory from the relation DB 14. The relation information acquiring unit 21 notifies the payment candidate selecting unit 25 of the acquired company directory.

The payment candidate selecting unit 25 selects, for example, a payment representative as a payment candidate based on the information in the company directory. Therefore, on the selection screen W2 of the user terminal 40, information on the payment representative serving as the payment candidate is displayed.

If the user U selects the payment representative on the selection screen W2, the payment management apparatus 10 transmits the payment acceptance request to the payment representative, and performs the payment process on the product upon receiving the payment acceptance from the payment representative. This process is the same as described above; therefore, explanation thereof will be omitted.

Consequently, it is possible to further improve the convenience of the payment process by the payment management apparatus 10. Specifically, conventionally, when the user U purchases a product to be paid at company expense, the user U performs so-called out-of-pocket expense such that the user U temporarily pays the price for the product and then be reimbursed by the company later. In contrast, because the payment management apparatus 10 is configured as described above, payment is performed by the company side at the time of payment of the product. Consequently, it is possible to reduce the time and effort of the user U to be reimbursed by the company, enabling to improve the convenience.

Further, the payment management apparatus 10 may be configured to select which piece of information on the social graph and the company directory is to be selected depending on a product to be purchased or an instruction from the user U, and change a payment candidate depending on the selected and acquired information.

8. Hardware Configuration

Figure 13:
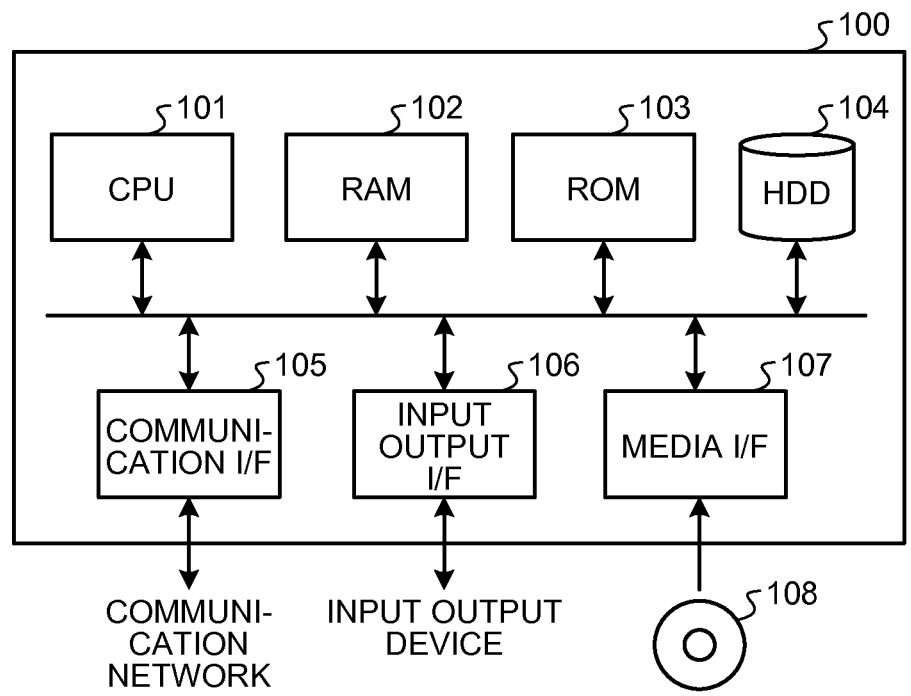
FIG. 13 is a diagram illustrating an example of a hardware configuration of a computer that executes a program.

The payment management apparatus 10, the user terminal 40, and the selected candidate terminal 50 of the embodiment as described above are realized by executing a program by a computer 100 configured as illustrated in FIG. 13, for example. FIG. 13 is a diagram illustrating an example of a hardware configuration of the computer 100 that executes the program. The computer 100 includes a CPU 101, a RAM 102, a read only memory (ROM) 103, a hard disk drive (HDD) 104, a communication interface (I/F) 105, an input output interface (I/F) 106, and a media interface (I/F) 107.

The CPU 101 operates based on a program stored in the ROM 103 or the HDD 104, and controls each unit. The ROM 103 stores therein a boot program executed by the CPU 101 when the computer 100 is activated, a program depending on the hardware of the computer 100, and the like.

The HDD 104 stores therein the program executed by the CPU 101, data used by the program, and the like. The communication interface 105 receives data from other apparatuses through the network N, sends the data to the CPU 101, and transmits data generated by the CPU 101 to the other apparatuses through the network N.

The CPU 101 controls an output device, such as a display or a printer, and controls an input device, such as a keyboard or a mouse, through the input output interface 106. The CPU 101 acquires data from the input device through the input output interface 106. The CPU 101 outputs generated data to the output device through the input output interface 106.

The media interface 107 reads a program or data stored in a recording medium 108, and provides the program or the data to the CPU 101 through the RAM 102. The CPU 101 loads the program from the recording medium 108 onto the RAM 102 through the media interface 107, and executes the loaded program. The recording medium 108 is, for example, an optical recording medium such as a digital versatile disc (DVD) or a phase change rewritable disk (PD), a magneto-optical recording medium such as magneto-optical (MO) disk, a tape medium, a magnetic recording medium, a semiconductor memory, or the like.

When the computer 100 functions as the payment management apparatus 10 according to the embodiment as described above, the CPU 101 of the computer 100 executes the program loaded on the RAM 102, and implements the functions of, for example, the purchase request receiving unit 20, the relation information acquiring unit 21, the history information acquiring unit 22, the payment acceptance policy acquiring unit 23, the payment acceptance denial policy acquiring unit 24, the payment candidate selecting unit 25, the list information notifying unit 26, the selected information acquiring unit 27, the authentication information acquiring unit 28, the payment acceptance requesting unit 29, the payment acceptance receiving unit 30, and the payment unit 31.

Furthermore, when the computer 100 functions as the user terminal 40 according to the embodiment as described above, the CPU 101 of the computer 100 executes the program loaded on the RAM 102 or a payment management program received from the payment management apparatus 10, and implements the functions of, for example, the transmitting unit 47, the receiving unit 48, and the display processing unit 49.

Moreover, when the computer 100 functions as the selected candidate terminal 50 according to the embodiment as described above, the CPU 101 of the computer 100 executes the program loaded on the RAM 102 or the payment management program received from the payment management apparatus 10, and implements the functions of, for example, the transmitting unit 57, the receiving unit 58, and the display processing unit 59.

The CPU 101 of the computer 100 reads the program from the recording medium 108 and executes the program. As another example, it may be possible to acquire the program form other apparatuses through the network N.

9. Advantageous Effects

The payment management apparatus 10 according to the embodiment receives a purchase request transmitted from the user terminal 40, and selects a plurality of payment candidates as candidates for a payer who pays the price for a product corresponding to the purchase request on behalf of the user U of the user terminal 40. Then, the payment management apparatus 10 notifies the user terminal 40 of information on a list of the payment candidates, and acquires, from the user terminal 40, information on a payment candidate selected from the list of the payment candidates as information on a selected candidate. The payment management apparatus 10 performs a payment process on the product based on the information on the selected candidate.

Therefore, it is possible to improve the convenience for the payment process in the payment management apparatus 10. Specifically, by configuring the payment management apparatus 10 as described above, for example, the user U can easily purchase the product by him/herself with the aid of payment by a third person (selected candidate). Further, for example, the user U need not perform operation of registering information on a relationship with a person who is requested to make payment in the payment management apparatus in advance, or requesting the person who is requested to make payment to purchase the product on behalf of the user U. Therefore, it is possible to reduce the time and effort of the user U.

Furthermore, the payment management apparatus 10 acquires relation information indicating relationships between the user U and other persons, and selects a plurality of payment candidates based on the acquired relation information. Therefore, the payment management apparatus 10 can select persons related to the user U as payment candidates. Consequently, it is possible to select the time and effort to select the payment candidates with respect to the user U.

Moreover, the payment management apparatus 10 determines a rank depending on the probability of the payment acceptance estimated based on the relation information for each of the payment candidates, and includes information on the rank in the information on the list of the payment candidates. Therefore, for example, the payment management apparatus 10 can display the payment candidates in order from the highest probability of the payment acceptance, and the user U can easily determine and select a payment candidate who is likely to accept the payment. Consequently, it is possible to further improve the convenience of the payment management apparatus 10.

Furthermore, the payment management apparatus 10 transmits the payment acceptance request to the selected candidate terminal 50, and upon receiving information indicating payment acceptance, performs the payment process on the product based on the information on the selected candidate. Therefore, the payment management apparatus 10 can perform the payment process after confirming the intention of the selected candidate A to make payment.

Moreover, the payment management apparatus 10 selects a plurality of payment candidates based on the history information on the payment acceptance. Therefore, for example, the payment management apparatus 10 can select persons who have performed payment as the payment candidates. Consequently, it is possible to reduce the time and effort to select the payment candidates with respect to the user U. Further, the payment management apparatus 10 can display the payment candidates in order from the highest probability of the payment acceptance, and the user U can easily determine and select a payment candidate who is likely to accept the payment. Consequently, it is possible to further improve the convenience of the payment management apparatus 10.

Furthermore, when the content of the purchase request meets the payment acceptance policy, the payment management apparatus 10 does not transmit the payment acceptance request to the selected candidate terminal 50, and performs the payment process of the product with respect to the selected candidate A as a payer. Therefore, it is possible to promptly conduct a product transaction. Further, it is possible to reduce the time and effort to perform the payment acceptance by the selected candidate A of the selected candidate terminal 50. Consequently, it is possible to further improve the convenience of the payment management apparatus 10.

Moreover, the information on the payment acceptance policy includes at least one of the pieces of information on the user, a type and a content of the product, an upper limit of the price for the product, a purchase time of the product, a store in which the product is purchased, a type of the store, and a time period in which the payment acceptance is performed. Therefore, it is possible to set various conditions as the payment acceptance policy. Consequently, it is possible to further improve the convenience of the payment process in the payment management apparatus 10.

Furthermore, when the content of the purchase request meets the payment acceptance policy, the payment management apparatus 10 preferentially selects a payment candidate corresponding to the payment acceptance policy. Therefore, it is possible to promptly perform the payment process from the purchase request.

Moreover, when the content of the purchase request meets the payment acceptance denial policy, the payment management apparatus 10 exclude a payment candidate corresponding to the payment acceptance denial policy. Therefore, for example, the payment management apparatus 10 does not select but exclude a payment candidate who is less likely to accept the payment even when the payment acceptance request is issued. Consequently, it is possible to reduce the time and effort to select the payment candidates with respect to the user U. Further, for example, the payment management apparatus 10 can select a payment candidate who is more likely to accept the payment.

Furthermore, the payment management apparatus 10 includes authentication information for authenticating the user terminal 40 in the payment acceptance request, and transmits, to the selected candidate terminal 50, the payment acceptance request with the authentication information. Therefore, the selected candidate A of the selected candidate terminal 50 can confirm that the transmitted payment acceptance request is an authenticated payment acceptance request sent from the user terminal 40 of the user U.

Moreover, the payment management apparatus 10 acquires, from the user terminal 40, information on a plurality of payment candidates selected from the list of the payment candidates as information on a plurality of selected candidates. Therefore, for example, when receiving a payment acceptance from at least one of the selected candidate terminals to which the payment acceptance requests have been sent, the payment management apparatus 10 performs the payment process, so that it is possible to easily settle a product transaction. Further, it is possible to improve the convenience of the payment process by the payment management apparatus 10.

Furthermore, when receiving pieces of information indicating payment acceptances from a plurality of the selected candidate terminals 50, the payment management apparatus 10 performs the payment process of the product with respect to a selected candidate as a payer corresponding to information on the firstly-received payment acceptance. Therefore, it is possible to promptly conduct a product transaction. Consequently, it is possible to further improve the convenience of the payment process by the payment management apparatus 10.

10. Others

The components of the apparatuses illustrated in the drawings are functionally conceptual and do not necessarily have to be physically configured in the manner illustrated in the drawings. That is, specific forms of distribution and integration of the apparatuses are not limited to those illustrated in the drawings, and all or part of the apparatuses may be functionally or physically distributed or integrated in arbitrary units depending on various loads or use conditions.

Further, all or part of the functions of the units 20 to 31 of the payment management apparatus 10 as described above may be implemented by, for example, at least any of the control unit 46 of the user terminal 40 and the control unit 56 of the selected candidate terminal 50, and the other functions may be implemented by the control unit 13 of the payment management apparatus 10. In the above described example, the relation information acquiring unit 21 and the other acquiring units 22, 23, 24, and 28 acquire various kinds of information from corresponding DBs 14 to 18; however, it is not limited thereto. For example, it may be possible to acquire various kinds of information from a different server (not illustrated).

The payment candidate selecting unit 25 of the payment management apparatus 10 as described above may select a plurality of payment candidates based on at least one of the relation information, the history information, and the information on the payment acceptance policy.

While an example is described in which the user U purchases a product in the payment management apparatus 10 as described above, it is not limited thereto. For example, the payment management apparatus 10 may be applied to a case in which a friend is requested to make payment for a gift. While the pieces of information registered in each of the DBs 14 to 18 are illustrated in detail above, they are described by way of example, and the information is not limited to this example.

According to the embodiment, it is possible to improve the convenience of a payment process when purchasing a product or a service.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A payment management apparatus comprising:
    a memory storing a social graph indicating relationships between a user and other persons; and
    a processor operatively connected to the memory, the processor being programmed to:
        receive a purchase request transmitted from a user terminal of the user;
        in response to receiving the purchase request, acquire from the memory the social graph indicating relationships between the user and the other persons as relation information;
        based on the acquired relation information, select a plurality of payment candidates as candidates for a payer who pays a price for a purchasing object corresponding to the purchase request on behalf of the user;

notify the user terminal of information on a list of the plurality of payment candidates;

for each payment candidate on the list of payment candidates, determine a rank depending on probability of payment acceptance based on the relation information;

insert information on the rank into the information on the list of payment candidates;

acquire, from the user terminal, information on a payment candidate selected from the list of payment candidates as information on a selected candidate; and perform a payment process on the purchasing object based on the acquired information on the selected candidate.

2. The payment management apparatus according to claim 1, wherein the processor is programmed to:

when the information on the selected candidate is acquired, transmit a payment acceptance request for payment acceptance by the selected candidate to a selected candidate terminal that is a terminal of the selected candidate;

receive information indicating acceptance of payment in response to the payment acceptance request from the selected candidate terminal; and when the information indicating the payment acceptance is received, perform the payment process on the purchasing object based on the information on the selected candidate.

3. The payment management apparatus according to claim 2, wherein:

the memory is configured to store therein history information on the payment acceptance, and the processor is programmed to select the plurality of the payment candidates based on the history information on the payment acceptance stored in the memory.

4. The payment management apparatus according to claim 2, wherein:

the memory is configured to store therein, as a payment acceptance policy, a condition for automatically performing the payment acceptance, in association with the payment candidates, when a content of the purchase request meets the payment acceptance policy, the processor is programmed to not transmit the payment acceptance request to the selected candidate terminal, and when the content of the purchase request meets the payment acceptance policy, the processor is programmed to set the selected candidate as a payer and performs the payment process of the purchasing object.

5. The payment management apparatus according to claim 4, wherein information on the payment acceptance policy includes at least one of pieces of information on the user, a type and a content of the purchasing object, an upper limit of a price for the purchasing object, a purchase time of the purchasing object, a store in which the purchasing object is purchased, a type of the store, and a time period in which the payment acceptance is performed.

6. The payment management apparatus according to claim 4, wherein when the content of the purchase request meets the payment acceptance policy, the processor is programmed to preferentially select a payment candidate corresponding to the payment acceptance policy.

7. The payment management apparatus according to claim 2, wherein:

the memory is configured to, when the payment acceptance request is issued with a content of the purchase request, store a condition for denying the payment acceptance, as a payment acceptance denial policy in association with the selected candidate, and when the content of the purchase request meets the payment acceptance denial policy, the processor is programmed to exclude a payment candidate corresponding to the payment acceptance denial policy.

8. The payment management apparatus according to claim 2, wherein:

the memory is configured to store therein authentication information for authenticating the user terminal, and the processor is programmed to insert the authentication information stored in the memory in the payment acceptance request, and transmit, to the selected candidate terminal, the payment acceptance request with the authentication information.

9. The payment management apparatus according to claim 1, wherein the processor is programmed to acquire, from the user terminal as information on a plurality of selected candidates, information on a plurality of payment candidates selected from the list of the payment candidates.

10. The payment management apparatus according to claim 9, wherein the processor is programmed to:

transmit a payment acceptance request for a payment acceptance to each of selected candidate terminals, which are terminals of the plurality of the selected candidates, based on the information on the acquired plurality of the selected candidates;

receive information indicating the payment acceptance in response to the payment acceptance request from each of the selected candidate terminals; and when the information indicating the payment acceptance from each of the selected candidate terminals is received, perform the payment process of the purchasing object with respect to the selected candidate as a payer corresponding to information indicating a firstly-received payment acceptance.

11. A payment management method comprising:

receiving a purchase request transmitted from a user terminal of a user;

in response to receiving the purchase request, acquiring a social graph indicating relationships between the user and other persons as relation information;

based on the acquired relation information, selecting a plurality of payment candidates as candidates for a payer who pays a price for a purchasing object corresponding to the received purchase request on behalf of a user who holds the user terminal;

notifying the user terminal of information on a list of the plurality of payment candidates; for each payment candidate on the list of payment candidates, determining a rank depending on probability of payment acceptance based on the relation information;

inserting information on the rank into the information on the list of payment candidates;

acquiring, from the user terminal, information on a payment candidate selected from the list of payment candidates as information on a selected candidate; and performing a payment process on the purchasing object based on the acquired information on the selected candidate.

12. A non-transitory computer-readable storage medium containing program instructions for managing payment, wherein execution of the program instructions by one or more processors of a computer system causes the one or more processors to perform:
- receiving a purchase request transmitted from a user terminal of a user;
- in response to receiving the purchase request, acquiring a social graph indicating relationships between the user and other persons as relation information;
- based on the acquired relation information, selecting a plurality of payment candidates as candidates for a payer who pays a price for a purchasing object corresponding to the received purchase request on behalf of a user who holds the user terminal;
- notifying the user terminal of information on a list of the plurality of payment candidates; for each payment candidate on the list of payment candidates, determining a rank depending on probability of payment acceptance based on the relation information;
- inserting information on the rank into the information on the list of payment candidates;
- acquiring, from the user terminal, information on a payment candidate selected from the list of payment candidates as information on a selected candidate; and
- performing a payment process on the purchasing object based on the acquired information on the selected candidate.

* * * * *